US012803314B2

(12) United States Patent
Roni-Damond

(10) Patent No.: US 12,803,314 B2
(45) Date of Patent: Nov. 17, 2026

(54) AUTOMATIC METHOD OF POWER ECOLOGICAL MANAGEMENT FOR A CRANE

(71) Applicant: MANITOWOC CRANE GROUP FRANCE, Dardilly (FR)

(72) Inventor: Bruno Roni-Damond, Lyons (FR)

(73) Assignee: Manitowoc Crane Group France, Dardilly (FR)

( * ) Notice: Subject to any disclaimer, the term of this patent is extended or adjusted under 35 U.S.C. 154(b) by 616 days.

(21) Appl. No.: 18/485,791

(22) Filed: Oct. 12, 2023

(65) Prior Publication Data

US 2024/0128777 A1 Apr. 18, 2024

(30) Foreign Application Priority Data

Oct. 12, 2022 (FR) ...................................... 2210468

(51) Int. Cl.

*H02J 7/00* (2026.01)
*B66C 13/22* (2006.01)
*B66C 13/48* (2006.01)

(52) U.S. Cl.

CPC ............. *H02J 7/865* (2026.01); *B66C 13/22* (2013.01); *B66C 13/48* (2013.01); *H02J 7/855* (2026.01)

(58) Field of Classification Search

CPC ........ H02J 7/865; H02J 7/855; H02J 2101/10; H02J 3/32; H02J 3/48; H02J 3/381;

(Continued)

(56) References Cited

U.S. PATENT DOCUMENTS 4,477,764 A * 10/1984 Pollard .................... B60L 50/52 307/84
6,308,639 B1 * 10/2001 Donnelly ................ B60L 50/10 105/133

(Continued)

FOREIGN PATENT DOCUMENTS

CN 107757603 A * 3/2018 ............ B60W 10/08
EP 4056516 A1 9/2022

(Continued)

OTHER PUBLICATIONS

N. Zhao, N. Schofield and W. Niu, “Energy Storage System for a Port Crane Hybrid Power-Train,” in IEEE Transactions on Transportation Electrification, vol. 2, No. 4, pp. 480-492, Dec. 2016 (Year: 2016).*

(Continued)

*Primary Examiner* — M Baye Diao
(74) *Attorney, Agent, or Firm* — Cook Alex Ltd.

(57) ABSTRACT

An automatic method of power management for supplying power to a crane includes a main power source comprising a generating set having an optimum power range in which it delivers a main power and a rechargeable secondary power source configured to deliver a secondary power, has a charge level, and may be recharged by the main power source. The automatic method implements, depending on the power required for the operation of the crane and the charge level, one or more power management modes for which the crane receives power coming from the single main power source or from the two power sources, and such that the generating set operates for each of them in the optimum power range.

20 Claims, 4 Drawing Sheets

(58) Field of Classification Search
CPC . H02J 3/38; H02J 3/17; H02J 2103/30; B66C 13/22; B66C 13/48; B66C 2700/081; B66C 13/12
USPC .......................................................... 320/128
See application file for complete search history.

(56) References Cited

U.S. PATENT DOCUMENTS

| | | | | |
|---|---|---|---|---|
| 8,063,510 | B2 * | 11/2011 | Utsumi | H02J 7/04 320/155 |
| 9,859,789 | B2 * | 1/2018 | An | H02M 3/04 |
| 10,236,820 | B2 * | 3/2019 | Schmidt | H02S 30/10 |
| 2017/0275140 | A1 | 9/2017 | Zhang et al. | |
| 2022/0271563 | A1 * | 8/2022 | Hug | H02J 9/06 |

FOREIGN PATENT DOCUMENTS

| | | | | |
|---|---|---|---|---|
| FR | 2999029 | A1 | 6/2014 | |
| GB | 2508577 | A * | 6/2014 | H02J 1/10 |

OTHER PUBLICATIONS

Z.-j. Li, Z. Li, H.-j. Li, Y. Zheng, C. Shang and Y. Sun, “Research of coordinated control method of hybrid power crane system,” 2012 Proceedings of International Conference on Modelling, Identification and Control, Wuhan, China, 2012, pp. 1093-1097. (Year: 2012).*

Search Report and English translation of Written Opinion issued in connection with FR Pat. Appl. 22/10468, dated Apr. 12, 2023.

* cited by examiner

Q1 : PF > P1opt_max?
Q2 : C > C2 ?
Q3 : PF > P1opt_min?
Q4 : PF = 0 ?
Q5 : C > C1 ?
Q6 : C < Cmax ?
Q7 : C = Cmax ?

AUTOMATIC METHOD OF POWER ECOLOGICAL MANAGEMENT FOR A CRANE

FIELD

The present disclosure relates to an automatic method of power management for the power supply of a crane. The present disclosure relates more particularly to an automatic method allowing the use of a generating set and of a rechargeable secondary power source for a power supply of the crane which is less energy-consuming and more ecological as possible.

The subject matter of the present disclosure finds a non-limiting application for the top-slewing cranes and the self-erecting cranes.

BACKGROUND

Today, companies must positively comply with jurisdictional regulations to initiate their ecological transition and put into practice behaviors in favor of the sustainable development, with the aim of providing a global and lasting solution to the major environmental challenges of this century. The ecological transition aims to put in place a model of economic, social, resilient and sustainable development that positively rethinks the way of consuming, producing, working and living together, in particular on the grounds of the reducing of the energy consumption and of the emission of regulated exhaust constituents.

In known manner, the cranes on the construction sites may be supplied with energy either by the electrical network or by a generating set.

However, in some cases, it is not possible to link the crane to an available electrical network, and it is therefore essential to resort to autonomous energy sources, such as a generating set running on gasoline or diesel-type fuel. In this case, it is therefore necessary to size the generating set according to the electrical energy requirements of the crane.

However, the endothermic engines with which the generating sets are fitted are designed to operate optimally when they deliver a power comprised within an optimum power range, generally between 60% and 95% of the declared maximum power. When working outside this optimum power range, the generating sets consume more fuel and may emit more particles and/or products that may be regulated to varying extents in different jurisdictions. Eventually, the engine of the generating set may also be damaged by clogging.

However, the cranes have an energy operation that is not well suited to being power supplied by a generating set. Indeed, the cranes alternate waiting phases for which they require little or no power to operate (therefore below the optimum power range), with phases during which they are working and which are characterized by consumption power peaks (therefore beyond the optimum power range), the intensity of the power peaks being a function of all the actions that the crane performs simultaneously (for example the lifting of a load, or then the lifting of a load combined with a rotation of the boom, etc.).

Eventually, the engine of the generating set, when operating outside its optimum range, may also be damaged by clogging. In the worst case, the generating set may break down or no longer be usable. Here again, such a situation does not fit in favorably with a logic of sustainable development because it involves manufacturing a new generating set.

In order to be able to absorb a maximum power peak corresponding to all the possible movements that the crane could perform simultaneously, the generating sets are conventionally oversized with a capacity to deliver a main power that can reach a main maximum value greater than 1.5 times, or even 3 times, the maximum power required for nominal operation of the crane, depending in particular on the power supply technologies of the actuators that the crane comprises.

This oversizing has the impact that the generating set operates most of the time at no load or at low power outside its optimum power range, at best at 50% of its main maximum value. Consequently, the consumption of the generating sets is high and the risks emitting regulated exhaust constituents or damage to the generating set are significant. The oversizing also results in a physical oversizing/an increase of the size of the generating set, for example requiring more materials to manufacture its engine, its alternator, etc.

SUMMARY

The present disclosure proposes to be part of an approach that is both ecological and economical, by providing a solution for the power supply of a crane which consumes less energy, emits less regulated constituents and also using less raw materials for its design.

With the aim of solving these problems of consumption and regulated emissions caused by the generating sets, and of preventing their possible damage, the proposed subject matter of this disclosure concerns an automatic method of power management for supplying power to a crane requiring to operate and move a load an operating power that can reach a maximum operating value, which automatic method involves:

- a main power source comprising a generating set provided with an endothermic engine capable of supplying the crane with a main alternating current for a main power which can reach a principal maximum value; the generating set being sized according to a power ratio such that the main maximum value is equal to the maximum operating value multiplied by said power ratio which is lower than 1.2, and the generating set has an optimum power range bounded by a minimum optimum value and a maximum optimum value which is lower than the main maximum value;
- a secondary power source comprising at least one rechargeable electric battery, which has a charge level comprised between zero and a maximum charge level, and which is capable of providing a secondary alternating current to deliver a secondary power and capable of receiving a charge power to be electrically recharged;

the automatic method implementing a power management mode, called main mode, in which:

- if the operating power has an operating value included in the optimum power range of the generating set, and if the charge level is greater than a first charge threshold, then
- the crane is electrically connected to the single generating set so that it receives from the generating set the main power which is equal to the operating value, said generating set then operating in its optimum power range.

In other words, the crane uses an operating power to operate and perform a given action, such as lifting a load for example. The operating power is defined by a variable operating value which corresponds to the sum of supply powers to be provided to a set of electrical apparatuses involved in carrying out the action that the crane must perform. The operating value may reach a maximum operating value, which corresponds, among all the actions that the crane may possibly perform, to the one requiring the most supply power (that is to say for which the sum of supply powers is the highest).

In order to power supply the crane, and therefore its electrical apparatuses, the proposed automatic method of power management involves:

- a generating set corresponding to the main power source of the crane, and capable of providing a main power to it which be able to reach a main maximum value,
- but also a secondary power source consisting of at least one rechargeable battery and having a charge level, and delivering a secondary power to the crane.

In the remainder of the description, it will be appreciated that the main power source corresponds to the generating set.

As indicated later, the role of the secondary power source is to deliver a secondary power to the crane in the event that the operating value exceeds the maximum optimum value that can be provided by the generating set, so that the generating set remains in its optimum power range.

According to different variants described by the present disclosure, in the event that such a situation arises, the generating set is configured to provide a main value (which may be equal to or lower than the maximum optimum value) while the secondary power source must deliver to the crane a secondary power equal to the operating value minus the main value.

The use of a secondary power source therefore has the advantage of significantly limiting the oversizing of the generating set, and therefore of favoring the use of smaller generating sets.

Thus, in the context of the automatic method, the generating set is sized so that the power ratio between the main maximum value and the maximum operating value is lower than or equal to 1.2.

Advantageously, in other embodiments, the generating set may not be oversized (the power ratio then being equal to 1), or else be undersized (with a power ratio of lower than 1).

One of the advantages of the automatic power management method is therefore to promote the use of smaller generating sets having a much lower carbon footprint associated with their reduced manufacturing price (since their manufacture requires fewer materials to be extracted, and/or to be processed, and/or to be transported, etc.), thus contributing to making the power supply of the crane part of a positive approach in favor of the sustainable development.

As previously indicated, a generating set consumes less fuel, and therefore reduces regulated emissions, when the power that it delivers, here the main power, is included in the optimum power range, which is bounded by: a minimum optimum value, and a maximum optimum value which is lower than the main maximum value.

The automatic method disclosed herein is defined such that it comprises the power management mode, called main mode, in which only the generating set is electrically connected to the crane, the crane receiving from the generating set its main power which takes as value the operating value, and which is implemented if the following conditions are verified:

- the operating value of the operating power for the power supply of the crane is included in the optimum power range of the generating set;
- the charge level of the secondary power source is greater than the first charge threshold. The first charge threshold corresponds to a charge threshold below which it is estimated that the secondary power source must be recharged, in other words if its charge level is below this first charge threshold then the secondary power source is insufficiently charged. Conversely, when the charge level is above the first charge threshold, the secondary power source is considered to be sufficiently charged.

Thus, advantageously, the generating set delivers in the main mode a main power which is constantly included in its optimum power range, eliminating any risk of overconsumption of fuel, of excessive emission of regulated constituents.

This operation of the generating set in its optimum power range also offers other advantages such as:

- an optimized consumption and a reduction of its carbon footprint (reduced fuel consumption and significantly reduced emissions of carbon dioxide and regulated particles); and
- a better lifespan and a very low risk of damage.

Thus, the main mode of the automatic power management method fits positively into an economic and ecological logic in favor of the sustainable development by being less energy-intensive, less regulated emissions, etc.

Among the other advantages presented by the automatic power management method of the present disclosure:

- the generating set, as well as the secondary power source, if applicable, deliver an alternating current to the crane. Thus can be used, to implement the automatic power management method, generating sets and secondary power sources commercially available, having moderate prices, and recent enough to meet current safety and environmental standards and requirements;
- the generating set and the secondary power source are provided to be easily replaceable, making it possible for companies related to buildings and public works to implement the power management method with not very recent power sources, then to replace them later with power sources more in tune with today's environmental issues in the event of equipment renewal, to ultimately initiate or continue their ecological transition.

As will be explained later, another advantage of this automatic method is that it does not require for its implementation communication or driving between the crane and the generating set. In other words, this method does not use a control logic or a control circuit in which the crane (or at least its control/command system) would manage the main power delivered by the generating set.

According to one characteristic of the present disclosure, the automatic method implements another power management mode, called mixed mode, in which:

- if the operating power has an operating value non-zero and lower than the maximum optimum value and if the charge level is lower than the first charge threshold, then:
- the crane is electrically connected to the single generating set to receive its operating power from the single generating set, said generating set delivering its main power which has a main value; and
- the secondary power source is electrically connected to the generating set to receive from the generating set the charge power taking a given charge value, in order to recharge said secondary power source; and wherein the charge value is adjusted so that the main value, which corresponds to a sum of the operating value and the charge value, is included in the optimum power range, said generating set then operating in its optimum power range.

In other words, in the event that the charge level of the secondary power source is below the first charge threshold, meaning that the secondary power source is being discharged and needs to be recharged, and that the operating value of the operating power demanded by the crane for its power supply does not exceed the maximum optimum value of the optimum power range of the generating set, then the automatic method implements this power management mode called mixed mode.

In this mixed mode, the generating set is electrically linked to the crane and also to the secondary power source to power supply them both.

The charge value of the charge power demanded by the secondary power source is adjusted by the automatic method so that:

the sum of the main value and of the secondary value is equal to the operating value;

the main value always remains within the optimum power range.

Advantageously, the mixed mode is also designed so that the generating set supplies both the crane and the secondary power source while constantly operating in its power optimum range, for the same advantages as the main mode (optimized consumption, reduced carbon footprint, increased source lifetime, etc.).

In other words, the adjustment variable in this mixed mode is the charge power, which can be driven by the crane (or by its control-command system), in order to maintain the generating set in its optimum power range. It is therefore again clear that this method does not use an order from the control/command system of the crane to manage the main power delivered by the generating set. The operation of this method requires adjusting the charge value of the charge power, so that the generating set delivers only what the crane and the secondary power source demand in terms of power, and that this demand remains within the optimum power range.

Thus, the mixed mode of the automatic power management method fits positively into an economic and ecological logic in favor of the sustainable development.

According to one characteristic of the present disclosure, the automatic method implements another power management mode, called hybrid mode, in which:

if the operating power has an operating value which is greater than the maximum optimum value, and if the charge level is greater than a second charge threshold, then:

the crane is electrically connected to both the generating set and the secondary power source so that the crane receives:

the secondary power coming from the secondary power source, said secondary power taking a given secondary value; and the main power coming from the generating set, said main power taking a given main value;

and wherein the secondary value is adjusted so that the main value, which corresponds to the difference between the operating value and the secondary value, is included in the optimum power range, said generating set then operating within its optimum power range.

In other words, in the event that the operating value of the operating power demanded by the crane exceeds the maximum optimum value of the optimum power range of the generating set, the automatic method implements this power management mode called hybrid mode in which the secondary power source is configured to deliver a secondary value of secondary power:

equal to the difference between the operating value and a main value delivered by the generating set, and adjusted so that the main value delivered by the generating set is included in the optimum power range;

provided that its charge level is greater than a second charge threshold. This second charge threshold is representative of a state of charge of the secondary power source such that it is precisely capable of delivering said secondary value without the risk of presenting a state close to the discharge or of being completely discharged. Depending on the characteristics of the secondary power source, in particular its capacity, and the secondary value it must provide to compensate at least for the difference between the operating value and the maximum optimum value (in particular if these two values are relatively close), the second charge threshold may be substantially equal to the first charge threshold.

Advantageously, just as in the two previous power management modes, the hybrid mode is also designed so that the generating set constantly provides the main power, the main value of which is always included in the optimum power range, the secondary power source constantly providing for itself the difference in supply power to be provided to the crane as long as its state of charge/capacity allows it. Here again, the hybrid mode makes it possible to reduce/optimize the consumption of the generating set, to reduce its carbon footprint, and to preserve its state and thus increase its lifespan.

In other words, the adjustment variable in this hybrid mode is the secondary power, which may be driven by the crane (or by its control-command system), in order to maintain the generating set in its optimum power range. It is therefore once again clear that this method does not use an order from the control/command system of the crane to manage the main power delivered by the generating set. The operation of this method requires adjusting the secondary value of the secondary power, so that the generating set delivers only the remaining power that the crane demands, and this remaining power remains within the optimum power range.

Thus, the hybrid mode of the automatic power management method fits positively into an economic and ecological logic in favor of the sustainable development.

According to one characteristic of the present disclosure, the automatic method implements another mode of power management, called charge mode, in which:

if the operating power has an operating value zero, and if the charge level is lower than the maximum charge threshold, then the secondary power source is electrically connected to the generating set to receive from the generating set the charge power taking a given charge value, in order to recharge said secondary power source; and wherein the charge value is adjusted so that the main value, which corresponds to the charge value, is included in the optimum power range, said generating set then operating within its optimum power range.

In other words, the automatic method implements a power management mode called charge mode in order to charge the secondary power source if it is not fully charged when the crane is inactive, that is to say when it is not working.

Generally, the crane is inactive at the beginning and end of the day, when the crane operator is no longer present on the site.

The charge mode is defined such that the charge value/main value of the charge power/main power delivered by the generating set remains constantly within the optimum power range. Once the secondary power source is charged, if the crane is still inactive, the generating set, since it no longer has to deliver a main power, goes into standby or shuts down.

The charge mode also advantageously makes it possible to reduce/optimize the fuel consumption of the generating set, to prevent it from emitting too many regulated particles, and to keep it in good condition. It is therefore positively part of an economic and ecological logic in favor of the sustainable development.

In summary, advantageously, the automatic method of power management for power supplying a crane fits positively into the economic and ecological challenges of the sustainable development, by implementing in one variant a set of modes (main mode, mixed mode, hybrid mode, charge mode) such that for each of the modes included in this set, the generating set operates constantly within its optimum power range, for an optimized energy consumption and a lower carbon footprint.

According to one characteristic of the present disclosure, the automatic method comprises at least:

- a comparison step during which the operating value of the operating power is compared with the maximum optimum value,
- a comparison step during which the charge level is compared with the first charge threshold and/or the second charge threshold and/or the maximum charge level;
- a step of selecting the power management mode from among the main mode, the mixed mode, the hybrid mode and the charge mode, according to the comparison results of the aforementioned comparison steps.

The automatic method implements one of the four power management modes (main mode, mixed mode, hybrid mode, charge mode) according to at least two comparisons:

- a first comparison for which the operating value of operating power is compared with the maximum optimum value, which maximum optimum value is predetermined;
- a second comparison for which the charge level is compared with the first charge threshold and/or the second charge threshold and/or the maximum charge level, which are also predefined.

Thus, the selection of the power management mode is independent from the main power delivered by the generating set (to the crane, to the secondary power source, or to both) at a time t. As the maximum optimum value and the charge thresholds are predetermined parameters, the method to be implemented only requires knowledge of the operating power demanded by the crane and the charge level of the secondary power source.

Advantageously, this means that the generating set does not have to transmit information to the control command system of the crane implementing the automatic method. It therefore does not need to communicate with it.

According to one characteristic of the present disclosure, the automatic method also comprises a comparison step during which the operating value of the operating power is compared with the minimum optimum value.

According to one characteristic of the present disclosure, in the hybrid mode, the secondary value is adjusted so that the main value is equivalent to the maximum optimum value.

In the case of hybrid mode, as indicated above, the secondary power source is designed to deliver a secondary value:

- equal to the difference between the operating value and a main value delivered by the generating set, and
- adjusted so that the main value delivered is included in the optimum power range.

In one variant of the present disclosure, the main value may be equal to the maximum optimum value. The secondary value is then equal to the operating value minus the maximum optimum value. In the other variants, the main value is comprised between the minimum optimum value included, and the maximum optimum value not included.

According to one characteristic of the present disclosure, the power ratio is comprised between 0.6 and 1.2.

According to one embodiment, the power ratio is comprised between 0.6 and 0.8.

Advantageously, and as explained previously, the automatic method is designed in such a way that a generating set slightly oversized (that is to say for which the power ratio between the main power and the operating power is greater than 1) but also undersized (that is to say having a power ratio lower than 1) may be selected for its implementation.

According to one characteristic, the maximum optimum value is equal to kmax times the main maximum value, kmax being comprised between 0.8 and 0.95.

According to one characteristic, the minimum optimum value is equal to kmin times the main maximum value, kmin being non-zero and depending on the intrinsic properties of the generating set.

According to one embodiment, kmin is comprised between 0.4 and 0.8.

According to one characteristic, the first charge threshold is comprised between 50 and 90% of the maximum charge level.

According to one characteristic, the second charge threshold is comprised between 20% and 70% of the maximum charge level.

The first charge threshold and the second charge threshold depend on the battery technologies used. For example, for high performance batteries such as lithium batteries, the first charge threshold is generally comprised between 50% and 80% of the maximum charge level while the second charge threshold may be comprised between 20% and 50% of the maximum charge level. For lead-acid batteries, the first charge threshold is rather comprised between 70% and 90% of the maximum charge level while the second charge threshold is rather comprised between 50% and 70% of the maximum charge level.

According to one characteristic, at least one of the first charge threshold and of the second charge threshold is fixed (in other words not variable).

According to one possibility, the first charge threshold and the second charge threshold are fixed.

According to one variant, at least one of the first charge threshold and of the second charge threshold varies according to a measured temperature.

According to one possibility, the first charge threshold and the second charge threshold vary according to the measured temperature.

According to another possibility, the first charge threshold decreases when the measured temperature increases and/or the second charge threshold decreases when the measured temperature increases.

According to one embodiment, the measured temperature is a temperature of the secondary power source, or else an outside temperature.

In a known manner, the outside temperature has an influence on the rate of the electrochemical reactions occurring at the electrodes/electrolyte interfaces of the battery, i.e. on the capacity of the batteries and their performance/behaviour in terms of charging and discharging. If the temperature drops, the efficiency of the reaction on the electrode also decreases. Assuming the battery voltage remains constant, the discharge current decreases, so does the returnable power of the battery. Conversely, if the temperature increases, the returnable power of the battery then increases. However, if the temperature is too high, the batteries will overheat, with a significant risk that they will be damaged.

The automatic method advantageously takes into account the influence of the temperature on the efficiency and the capacity of the battery, by adjusting the values of the first charge threshold and of the second charge threshold as a function, according to two variants of the described in the present disclosure, of the temperature of the secondary power source or else the outside temperature, so that the at least one battery constituting the secondary power source sees its number of charge/discharge cycles reduced and does not damage if subjected to high (above 45°) or low (below 5°) temperatures. Thus, depending on the measured temperature, the automatic method leaves the first charge threshold and the second charge threshold at their current value (it does not modify them), or else it increases or decreases the latter.

An advantage of measuring the outside temperature is to modify the values of the first charge threshold and of the second charge threshold in the event of high or too low outside temperatures without waiting for the battery to reach a critical state that could damage it. For example, in the case of an outside temperature greater than 45°, the values of the first charge threshold and of the second charge threshold are decreased in order to reduce the number of cycles of the at least one battery of the secondary power source and the power provided before the at least one battery is overheated.

The present disclosure also concerns a load lifting assembly comprising:

- a crane comprising at least several electrical apparatuses and a control-command system in communication with said several electrical apparatuses, said crane using, to operate and move a load, an operating power being able to reach a maximum operating value, the operating power being equal to a sum of powers demanded by the electrical apparatuses;
- a main power source comprising a generating set provided with an endothermic engine capable of supplying the crane with a main alternating current fora main power which can reach a main maximum value; the generating set being sized according to a power ratio such that the main maximum value is equal to the maximum operating value multiplied by said power ratio which is lower than 1.2, and the generating set has an optimum power range bounded by a minimum optimum value and a maximum optimum value which is lower than the main maximum value;
- a secondary power source comprising at least one rechargeable electric battery, which has a charge level comprised between zero and a maximum charge level, and which is capable of providing a secondary alternating current to deliver a secondary power and capable of receiving a charge power to be electrically recharged;
- an electrical coupling circuit between the crane, the generating set and the secondary power source;

wherein the control-command system is in communication with:

- the secondary power source to receive the charge level and to adjust a secondary value of the secondary power and a charge value of the charge power; and
- the electrical coupling circuit for driving couplings between the crane, the generating set and the secondary power source;

and wherein said control-command system comprises a program for the implementation of the automatic power management method in accordance with the preceding description.

As indicated, the automatic power management method is contained in a program implemented in the control-command system of the crane. The role of the control-command system is to determine which power management mode (main mode, mixed mode, hybrid mode, charge mode) must be implemented according to the application context. This control-command system is linked to all the electrical apparatuses fitted to the crane, such as for example the actuators capable of moving a load and/or moving an element of the crane, and the electrical accessories such as lights, alarms, sensors, temperature control devices, control station, etc.

Advantageously, according to the design of the automatic method, to determine which power management mode must be selected, the only power source with which the control-command system needs to communicate is the secondary power source. It is therefore not necessary to install a means of communication, for example a communication bus, between the generating set and the crane in order to exchange information.

Also, the generating set does not exchange information with the secondary power source.

The generating set only delivers power to the crane and/or to the secondary power source when it is electrically linked to it or them via the electrical coupling circuit, and according to the power demand coming from it or them.

Consequently, the implementation of the automatic method is therefore more practical and less costly, with fewer hardware, software or protocol means to design and/or install.

Once the power management mode has been selected, the control-command system communicates with the electrical coupling circuit so that the latter electrically implements the selected power management mode, as explained below.

According to one characteristic of the present disclosure, the control-command system is designed to send a control order to the electrical coupling circuit, which is configured on receipt of the control order to electrically link or not the main power source to the secondary power source, the main power source to the crane, and the secondary power source to the crane.

As indicated above, the electrical implementation of a power management mode is ensured by the electrical coupling circuit such that:

- in the main mode, the electrical coupling circuit connects the generating set to the crane and disconnects the secondary power source from the crane and the generating set;

- in the mixed mode, it connects the generating set to the crane and to the secondary power source, and the secondary power source is however not connected to the crane;
- in the hybrid mode, it connects the crane to the generating set and to the secondary power source, and the generating set and the secondary power source are not connected to each other;
- in the charge mode, the generating set and the power source are connected to each other and both disconnected from the crane.

The electrical coupling circuit electrically implements the different power management modes as a function of instructions contained in a control order that it receives from the control-command system.

According to one characteristic, the control-command system is designed to send the control order as a function of results of comparison between at least the operating value of the operating power and the maximum optimum value, and also as a function of the charge level.

In other words, the control order that the control-command system sends to the electrical coupling circuit so that it implements a power management mode among the available power management modes depends on the results resulting from the aforementioned comparisons, and is generated as a result of them.

Advantageously, according to the design of the automatic method, the control command system does not need to know the main power delivered by the generating set to determine which power management mode must be implemented.

Since the characteristics of the generating set (that is to say the optimum power range and therefore the maximum optimum value) being information known by the operators when purchasing it, they can be, in one embodiment, entered by the latter in the program executing the automatic method.

Also, the operators inform the first charge threshold and the second charge threshold according to the type of secondary power source used, or the charge level for which they consider that the latter is discharged and needs to be charged.

The operating value of the operating power is known to the control-command system since it communicates with the electrical apparatuses of the crane; it therefore knows their power supply needs.

This is why, in terms of external communication and information, the decision-making by the control-command system to select a power management mode only requires the increase in the charge level of the secondary power source.

According to one characteristic of the present disclosure, depending on the measured temperature, the program implementing the automatic method:

- receives a measured temperature coming from a temperature sensor linked to the control-command system;
- varies at least one of the first charge threshold and the second charge threshold depending on the measured temperature.

As already written, this measured temperature may correspond either to the temperature of the secondary power source, or to the outside temperature.

In the case where the measured temperature corresponds to the temperature of the secondary power source, the temperature sensor may be integrated into the secondary power source, such as for example into its battery or into one of its batteries.

In the case where the outside temperature corresponds to the measured temperature, the temperature sensor may for example be mounted on the crane.

According to one characteristic of the present disclosure, in the mixed mode, the control-command system is configured to send a mixed mode adjustment order to the secondary power source so that it adjusts the charge value of the charge power demanded from the main power source, so that:

- the main power that the main power source transmits to the crane is equal to the operating value of the operating power necessary to operate the electrical devices of the crane; and
- the sum of the operating value and of the charge value is included in the optimum power range so that the main power source operates in its optimum power range.

According to one characteristic of the present disclosure, in the hybrid mode, the control-command system is configured to send a hybrid mode adjustment order to the secondary power source so that it adjusts the secondary value of the secondary power provided to the crane so that:

- the secondary value added to the main value of main power delivered by the main power source to the crane corresponds to the operating value of the operating power demanded by the crane; and
- the main value is included in the optimum power range so that the main power source operates within its optimum power range According to one characteristic of the present disclosure, in the charge mode, the control-command system is designed to send a charge mode adjustment order to the secondary power source so that it adjusts the charge value of the charge power demanded from the main power source, so that the charge value is included in the optimum power range so that the main power source operates in its optimum power range.

BRIEF DESCRIPTION OF THE DRAWINGS

Other characteristics and advantages of the present disclosure will appear on reading the detailed description below, of a non-limiting example of implementation, made with reference to the appended figures in which.

DESCRIPTION

Figure 1:
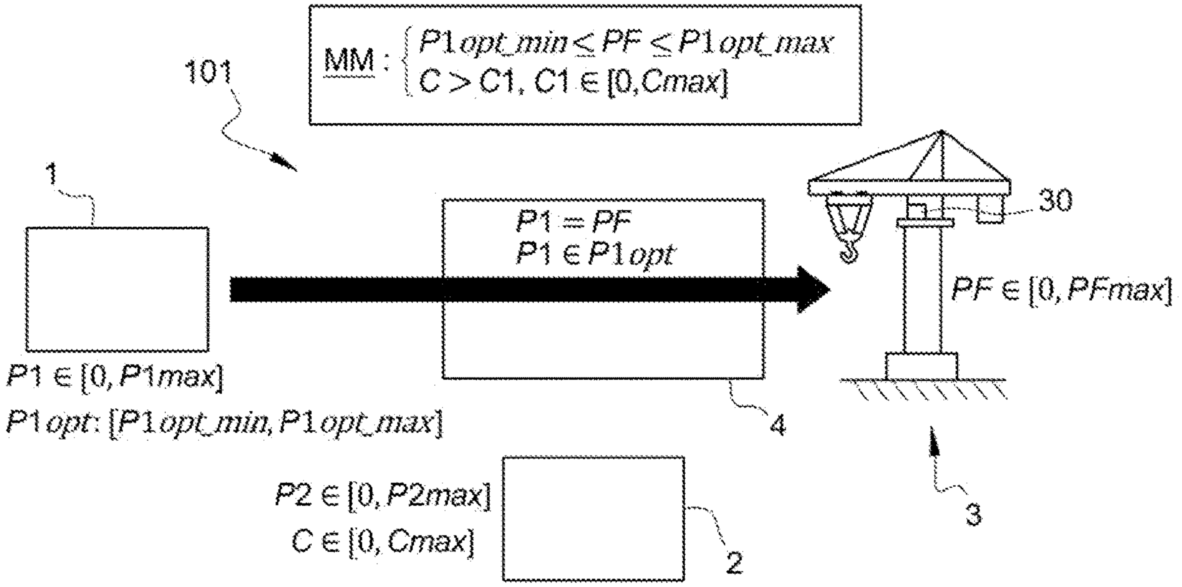
FIG. 1 is an illustration of the operating principle of the main mode according to an embodiment of the present disclosure.

As illustrated in FIGS. 1 to 4, the automatic power management method 100 is implemented within the framework of an application context of the assembly 101, for which are used a generating set provided with an endothermic engine and constituting a main power source 1, and a secondary rechargeable power source 2 comprising at least one rechargeable electric battery; this with the aim of supplying a crane 3 with an operating power PF necessary for its operation and for example necessary for moving a load such as lifting a load, or rotating the jib.

More specifically, the operating power PF is used to supply all of the electrical/electronic apparatuses of the crane 3 involved in its operation. Among these apparatuses: the actuators suitable for moving a load and/or moving an element of the crane (for example lifting winch, distribution winch, winch for lifting the jib, slewing motor; accessories such as lights; alarms; sensors; safety devices; temperature control devices; control station, etc.

The operating power PF required is variable and depends on the nature of the operating tasks and the electrical/electronic systems involved. The value of the operating power PF, or operating value, may reach a maximum operating value PFmax, which corresponds, among all the actions that the crane 3 can possibly perform, to that demanding the most supply power (that is to say for which the sum of the supply powers of the electrical/electronic systems is the highest) which generally corresponds to a simultaneous combination of several "simple" tasks, for example the implementation of several displacements such as a lifting of a load while the boom rotates.

The main power source 1 is used to deliver a main power P1 which can reach a main maximum value P1max. In the embodiment shown, the main power source 1 is a generating set with an endothermic engine. Also, in the remainder of the description, it is considered, for greater convenience, that the generating set refers to the main power source 1 and may therefore bear the same numerical reference "1".

The generating set 1 is characterized by an optimum power range P1opt bounded by a non-zero minimum optimum value P1opt_min and a maximum optimum value P1opt_max lower than P1max, in which it delivers a main power value P1, called main value, for a lower fuel consumption and a lower emission of carbon dioxide and regulated particles.

The secondary power source 2 is designed to deliver a secondary power P2 whose value, called secondary value, may reach a maximum secondary value P2max. It is also characterized by a charge level C (that is to say the capacity of the battery) which can be comprised between 0 and a maximum charge level Cmax (classically 100%).

As a reminder, as previously explained, conventionally, in order to absorb a maximum operating power peak PF, the generating sets are oversized with a capacity to deliver a main power P1 which can reach a main maximum value P1max greater than 1.5 times, or even 3 times the maximum operating value PFmax necessary for a nominal operation of the crane 3. This oversizing generally means that the generating sets rarely operate in their optimum power range P1opt.

The advantage of the automatic power management method 100 described herein is to avoid such overdimensioning and to enable the generating set 1 to be able, in the greatest number of possible situations, to operate in its optimum power range P1opt.

The secondary power source 2 is in particular provided to both make it possible to minimize the sizing of the generating set 1 but also, as already mentioned and re-indicated below, to deliver, if the operating value of the operating power PF should be greater than the maximum optimum value P1opt_max of the generating set 1, a secondary value equal to the operating value minus the maximum optimum value P1opt_max, the main power source 1 delivering to the crane 3 a main value equal to the maximum optimum value P1opt_max. In another variant, the main power source 1 may deliver a main value slightly lower than the maximum optimum value P1opt_max, so as to guarantee that the generating set 1 remains well within its optimum power range P1opt.

The present disclosure provides for several dimensions of the generating set 1 such that the power ratio of the main maximum value P1max to the maximum operating value PFmax is comprised between 0.6 and 1.2. Thus, in a first variant described by the present disclosure, the generating set 1 may be slightly oversized, for a power ratio greater than 1 and lower than 1.2; whereas in a second embodiment, it can on the contrary be slightly or significantly undersized, for a power ratio greater than or equal to 0.6 and lower than or equal to 1.

The sizing of the generating set 1 may, in part, be dictated by the performance of the references of the battery(ies) available and used as secondary power source 2.

An interest of the present disclosure is that it provides that the generating set 1 and the secondary power source 2 deliver to the crane 3 an alternating current. Thus, an embodiment of the present disclosure may be implemented by means of "standard" generating sets and batteries, that is to say commercially available at moderate prices.

As indicated previously, the generating set 1 and the secondary power source 2 are provided to be easily replaceable. Old generating sets 1 and secondary power sources 2 that would have been used to implement the automatic power management method 100 before may be replaced/changed with newer generating sets 1 and secondary power sources 2 responding favorably to the current safety and environmental requirements.

The optimum power range P1opt of the generating set 1 is defined such that:

- the maximum optimum value P1opt_max is equal to kmax times the main maximum value P1max, with kmax generally comprised between 0.8 and 0.95.
- the minimum optimum value P1opt_min is equal to kmin times the main maximum value P1max, the value of kmin depending on the characteristics/performance of the generating set 1 used and possibly comprised between 0.4 and 0.8, or even between 0.6 and 0.7.

According to the power management modes defining the automatic method 100, and which will be described later:

- the crane 3 is power supplied either by the main power source 1 only, or by the main power source 1 and the secondary power source 2, or by the secondary power source 2 only;
- in case of discharge, the secondary power source 2 is power supplied by the main power source 1 which provides it with a charge power Pload.

To this end, the assembly 101 comprises an electrical coupling circuit 4 serving to link electrically or not, depending on the power management mode implemented by the automatic method 100: the main power source 1 and the secondary power source 2 to the crane 3; and the main power source 1 to the secondary power source 2. These couplings are made according to control orders that the electrical coupling circuit 4 receives from the crane 3, more precisely from a control-command system 30 of the latter.

The automatic method 100 is contained and executed by a program implemented inside the control-command system 30 of the crane 3. In one embodiment, the automatic method 100 may be started at the beginning of the day, when the crane operator starts the control-command system 30.

Figure 5:
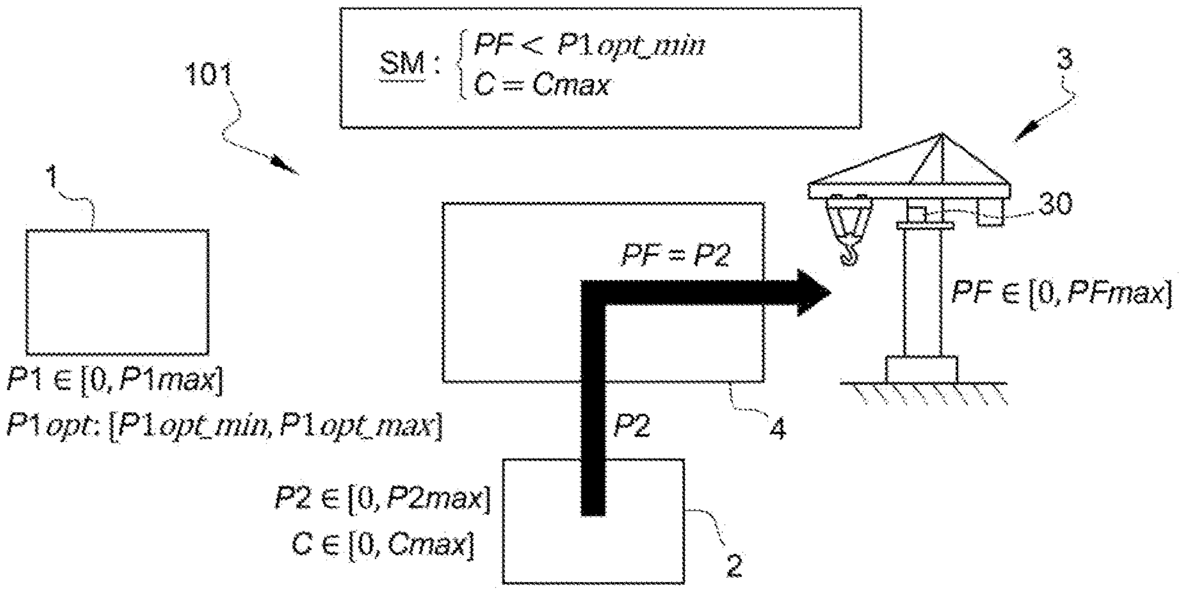
FIG. 5 is an illustration of the operating principle of a secondary mode for which only the secondary power source is electrically linked to the crane to supply it with power, this mode being implemented when the charge capacity of the at least one of the batteries constituting it is at its maximum charge level and the crane demands an operating power lower than the optimum minimum value, according to an embodiment.
Figure 6:
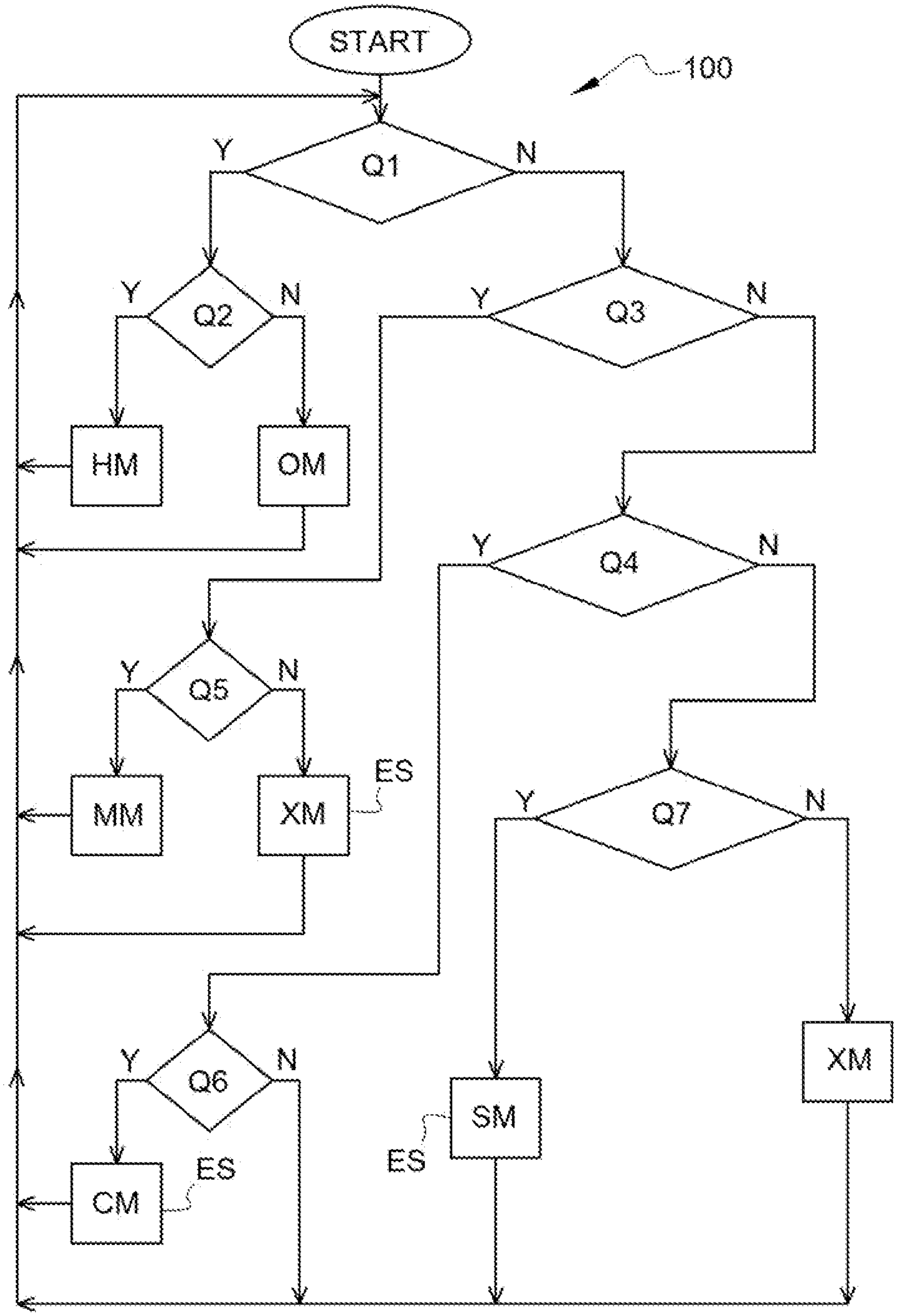
FIG. 6 is a flowchart of the automatic power management method according to an embodiment of the present disclosure, showing in particular how the different power management modes are selected according to the operating value of the operating power required for the power supply and the charge level of the secondary power source, according respectively to the optimum power range and the charge thresholds.

A flowchart of one of several possible embodiments of the automatic method 100 is illustrated in FIG. 5.

The power management modes that can be implemented by the automatic method 100 are activated according to the results of several comparisons. Among these comparisons:

- a comparison of the maximum operating value PFmax with the maximum optimum value P1opt_max and eventually also with the minimum optimum value P1opt_min, in particular to determine if the maximum operating value PFmax is included in the optimum power range P1opt, and
- comparisons between the charge level C of the secondary power source 2 with a first charge threshold C1, a second charge threshold C2 and the maximum charge level Cmax.

The first charge threshold C1 corresponds to a charge threshold below which it is estimated that the secondary power source 2 must be recharged, in other words if its charge level C is below this first charge threshold C1 then the secondary power source 2 is insufficiently charged. The first charge threshold C1 is comprised between 50% and 90% of the maximum charge level Cmax.

The second charge threshold C2 is representative of a state of charge of the secondary power source such that it is precisely capable of delivering a secondary value of secondary power P2 to the crane 3 without the risk of presenting a state close to discharge or to be completely discharged. According to different embodiments described by the present disclosure, depending on the characteristics and performance of the secondary power source 2, the second charge threshold C2 may be lower than the first charge threshold C1, or else be substantially equal to the latter. The second charge threshold C2 is comprised between 20% and 70% of the maximum charge level Cmax.

The realization of the different comparisons implemented by the automatic method 100 require that the program/the control command system 30 know the following information:

- the operating value of the operating power PF demanded by the crane 3;
- the minimum optimum value P1opt_min and the optimum value P1_optmax of the generating set 1;
- the charge level C, the first charge threshold C1, and the second charge threshold C2 of the secondary power source 2.

The characteristics of the generating set 1 being information known by the operators when it is purchased, they can be, in one embodiment, entered by the latter in the program executing the automatic method, for example during a parameterization step taking place before the actual execution step. The charge thresholds C1 and C2 may for their part be defined by the user, in particular by taking into account the characteristics of the battery.

Finally, the operating power PF is known to the control-command system given that it communicates with the electrical/electronic apparatuses of the crane 3; knowing their power supply needs.

Knowing the operating power PF and the optimum power range P1opt of the generating set 1, the control-command system 30 does not need to know the main power P1, therefore to communicate with it for activating the power management modes and driving the electrical coupling circuit 4.

On the other hand, the control-command system must be aware of the charge level C of the secondary power source 2.

This is why it is only necessary for the secondary power source 2 among the two power sources to communicate with the control-command system 30 of the crane 3, for example by means of a communication bus or of a wireless communication protocol, in order to transmit the charge level(s) C to it.

Optionally, and so that the impact of the temperature of the environment on the performance of the at least one battery included in the secondary power source 2 is taken into account, the program executing the automatic method may modify the values of the first charge threshold C1 and of the second charge threshold C2 according to the temperature of the secondary power source 2 (in a first variant described by the present disclosure), or the outside temperature (in a second variant described by the present disclosure), more precisely according to a measurement of said temperature of the secondary power source 2 or said outside temperature which is transmitted to the control-command system 30.

Depending on the temperature of the secondary supply source 2 or the outside temperature, the program:

- leaves as it is/does not modify the values of the first charge threshold C1 and of the second charge threshold C2, or
- increases at least one of the two values, or
- decreases at least one of the two values.

In one embodiment, when defining the first charge threshold C1 and the second charge threshold C2 during the parameterization step, the operator may enter different temperature ranges in which the first charge threshold C1 and the second charge threshold C2 take a given first charge threshold value and a given second charge threshold value. During the execution of the automatic method, when a temperature measurement of the temperature of the secondary power source 2 is transmitted to the control command system 30, the program determines to which temperature range corresponds the measured temperature, and adapts the first charge threshold value C1 and the second charge threshold value C2 accordingly.

In the embodiment where the temperature measured and transmitted to the control-command system 30 corresponds to the temperature of the secondary power source 2, the temperature of the secondary power source 2 is either:

- if the technology of the at least one battery included in the secondary power source 2 allows it, transmitted by the secondary power source 2 itself (at the same time as the charge level),
- measured and then transmitted by an external temperature measurement device in communication with both the secondary power source 2 and the control-command system 30.

In the embodiment where the measured temperature corresponds to the outside temperature, the outside temperature is either:

- measured and then transmitted by an external temperature measurement device in communication with the control-command system 30 of the crane 3,
- or an apparatus integrated into the crane 3 in communication with the control-command system 30, for example a temperature measurement sensor.

In one embodiment, the stopping of the automatic method 100 may occur at the end of the day, with the crane operator turning off the control-command system 30 (note that the stop step "STOP" of the automatic method is not shown in FIG. 5). In a second embodiment, it is conceivable that the stopping of the automatic method 100 takes place automatically if the crane 3 is put to rest (and therefore its operating power is zero), and if the charge level C of the source secondary power supply 2 is at its maximum charge level Cmax after an automated recharging of the battery.

Between its start and its stop, the automatic method 100 is executed continuously, and switches from one power management mode to another power management mode among the several power management modes that it comprises according to the comparison results of the comparison steps.

The order in which these comparison steps are carried out does not matter since only their result counts. In the embodiment illustrated in FIG. 5, the selection of the power management modes during selection steps ES is firstly based on power comparisons (in particular to determine whether the operating power PF is included in the optimum power range P1opt) then on comparisons between the charge level C and the charge thresholds C1, C2. In another embodiment, it is conceivable that the comparisons between the charge level C and the charge thresholds C1, C2 could be carried out before the power comparisons.

In the remainder of the description, the power management modes implemented in the present examples and their activation conditions are now presented.

Referring to FIG. 5, during a comparison step Q1, the automatic method 100 determines if the operating value of the operating power PF is greater than the maximum optimum value P1opt_max. If this is not the case, it then compares the operating value during a comparison step Q3 with the minimum optimum value P1opt_min, with the aim of determining if it is included in the optimum power range P1opt.

If the operating value is included in the optimum power range P1opt, then the automatic method 100 compares the charge level C of the secondary power source 2 with the first charge threshold C1 during a comparison step Q5. If the charge level C is greater than the first charge threshold C1, then a first power management mode called main mode MM is selected. If not, a second power management mode called mixed mode XM is selected.

In the main mode MM, illustrated in FIG. 1, the electrical coupling circuit 4 electrically links only the generating set 1 to the crane 3, with the generating set 1 delivering a main power P1 which is constantly included in the optimum power range P1opt (because the operating power PF is included in this optimum power range P1opt), eliminating any risk of overconsumption of fuel, excessive emission of regulated exhaust constituents, and damage to the generating set 1. In this main mode MM, the secondary power source 2 has its charge level C greater than the first charge threshold C1, and it therefore does not need to be recharged, and therefore it is not connected to the generating set 1.

Figure 2:
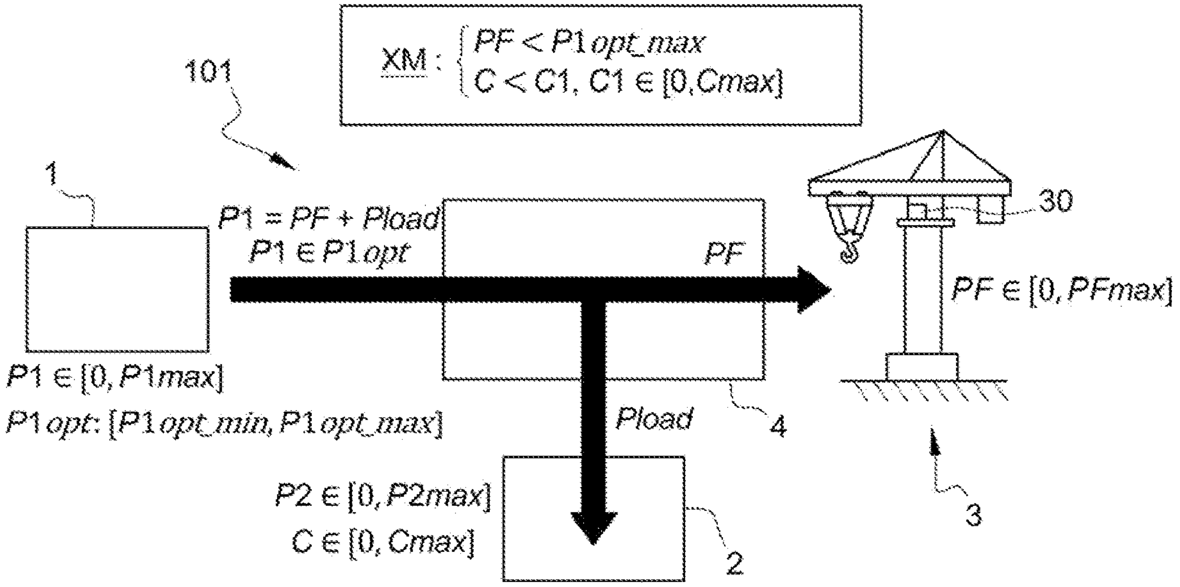
FIG. 2 is an illustration of the operating principle of the mixed mode according to an embodiment.

In the mixed mode XM, illustrated in FIG. 2, the electrical coupling circuit 4 electrically links the generating set 1 to both the secondary power source 2 and the crane 3. Being in communication with the secondary power source 2, the crane 3 is configured to drive it by sending it an adjustment order. The adjustment order is that the secondary power source 2 adjusts the charge power Pload that it demands and receives from the generating set 1, so that the main power P1 that it delivers, and which is equal to the sum of the operating power PF and the charge power Pload, is included in the optimum power range P1opt. In this mixed mode XM, the secondary power source 2 has its charge level C lower than the first charge threshold C1, and it therefore needs to be recharged, and therefore it is connected to the generating set 1 to receive the charge power Pload adjusted.

In the case, for example, where the operating power PF demanded by the crane 3 remains included in the optimum power range P1opt, and the charge level C of the secondary power source 2 again becomes greater than the first charge threshold C1, the automatic method 100 switches from the mixed mode XM to the main mode MM.

If at the end of the comparison step Q3, it is determined that the operating power PF is lower than the minimum optimum value P1opt_min, a new comparison step Q4 is implemented to determine if the operating power PF is equal to zero or not.

If in step Q4 the operating power PF is non-zero (and therefore is comprised between 0 and the minimum optimum value P1opt_min), the automatic method 100 then determines during a comparison step Q7 if the charge level C of the secondary power source 2 is at its maximum charge level Cmax.

If the charge level C is lower than the maximum charge level Cmax, the automatic method 100 implements the mixed mode XM described above.

Otherwise, if the charge level C is equal to the maximum charge level Cmax (in other words if the secondary power source 2 is fully charged), the automatic method 100 implements a secondary mode SM during which only the secondary power source 2 is electrically linked to the crane 3, and supplies the latter with a secondary power P2 corresponding to the operating power PF demanded. In this secondary mode SM, the main power source 1 is linked neither to the crane 3 nor to the secondary power source 2, and may therefore be put on standby. According to one option, this secondary mode SM may be implemented as long as the charge level C is greater than the first charge threshold C1, and of course as long as also the operating power PF is non-zero and lower than the minimum optimum value P1opt_min. If in step Q4 the operating power PF is zero, meaning that the crane 3 is not in demand for power, the automatic method 100 checks during a comparison step Q6 if the secondary power source 2 is fully charged or not (so if the charge level C is equal to the maximum charge level Cmax).

Figure 3:
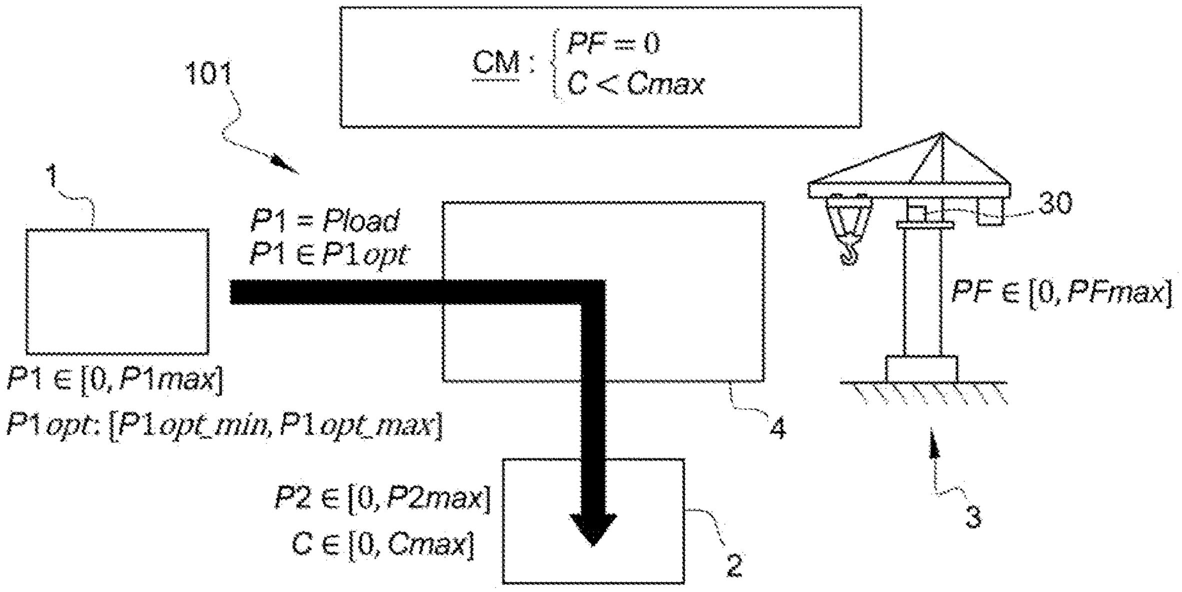
FIG. 3 is an illustration of the operating principle of the charge mode, according to an embodiment.

If in step Q6 the charge level C is lower than the maximum charge level Cmax (in other words the secondary power source 2 is not fully charged), the automatic method 100 implements a charge mode CM, illustrated in FIG. 3, in which the electrical coupling circuit 4 electrically links the generating set 1 to the secondary power source 2 so that it provides a main power P1 corresponding to a charge power Pload to recharge the secondary power source 2. The crane 3 does not receive any power from the two power sources 1, 2. In this charge mode CM, the control-command system 30 of the crane 3 is also configured to drive the secondary power source 2 by sending it an adjustment order so that it adjusts the charge power Pload that it demands from the generating set 1, so that it is included in the optimum power range P1opt. In this way, the main power P1 is included in the optimum power range P1opt.

If in step Q6 the charge level C is equal to the maximum charge level Cmax (in other words the secondary power source 2 is fully charged), the generating set 1, insofar as it does not have to deliver main power P1 goes into standby or goes out while waiting for the automatic method 100 to implement another power management mode. If the crane 3 remains inactive for a very long time, the charge level C of the at least one battery may eventually decrease. In this case, if it is active, the automatic method 100 then implements the charge mode CM.

Following the comparison step Q1, in the case where the operating power PF is greater than the maximum optimum value P1opt_max, the automatic method 100 proceeds to a comparison step Q2 during which it is checked if the charge level C of the secondary power source 2 is or is not greater than the second charge threshold C2. It should be noted that this scenario, where the operating power PF demanded by the crane 3 is greater than the maximum optimum value P1opt_max, corresponds to a case of peak power associated with a peak in activity of the crane 3 with a large number of electrical apparatuses requiring a power supply and which can reach PFmax.

Figure 4:
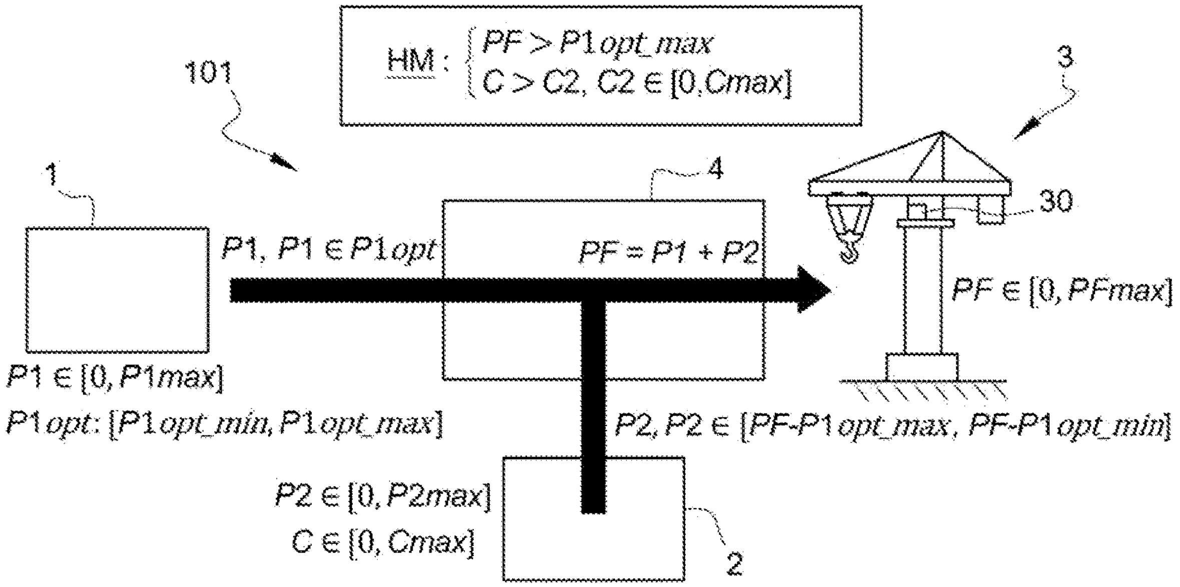
FIG. 4 is an illustration of the operating principle of the hybrid mode, according to an embodiment.

If in step Q2 the charge level C is greater than the second charge threshold C2, the automatic method 100 implements a power management mode called hybrid mode HM, illustrated in FIG. 4, in which the electrical coupling circuit 4 electrically links the generating set 1 and the secondary power source P2 to the crane 3 so that it delivers to it respectively a main power P1 and a secondary power P2. In this hybrid mode HM, the control-command system 30 is designed to send to the secondary power source 2 an adjustment order so that the secondary power P2 that it sends to the crane 3 is at least equal to the difference between the operating power PF and the maximum optimum value P1opt_max, and at maximum equal to the difference between the operating power PF and the maximum optimum value P1opt_min, the generating set 1 then delivering a main power P1 still included in the optimum power range P1opt.

If in step Q2 the charge level C is lower than the second charge threshold C2, the automatic method 100 implements a power management mode called critical mode OM, in which the electrical coupling circuit 4 electrically connects the generating set 1 to the crane 3 so that it delivers a main power P1 to it, such that the main power P1 is greater than the maximum optimum value P1opt_max, in other words the generating set 1 is out of its optimum range Popt. In this critical mode OM the main power P1 may even be equal to the main maximum value P1max.

In this critical mode OM, the electrical coupling circuit 4 may also electrically link the secondary power source 2 to the crane 3 (depending on how the second charge threshold C2 has been fixed) so that the secondary power source 2 may provide for a given period of time (until it is completely discharged) a secondary power P2 making it possible to supplement, if necessary, the main power P1 provided by the generating set 1 in order to reach together the operating power PF in the exceptional case where the operating power PF is greater than the main maximum value P1max.

In another variant of the present disclosure, during the critical mode OM, the control-command system 30 is configured to determine at what rate the secondary power source 2 discharges when it must provide the secondary power P2, an excessive discharge presenting a high risk of completely discharging the secondary power source 2. In the event that this eventuality occurs:

- the secondary power source 2 no longer provides secondary power P2 to the crane 3,
- certain actions of the crane 3 which consume too much power are interrupted, such as the lifting operations,
- the generating set 1 provides a main power P1 to the crane 3 with a view to it continuing to carry out actions that are lower costly in energy, as well as to the secondary power source 2 to recharge it until it reaches at least the second charge threshold C2. This configuration is different from the mixed mode XM because the generating set 1 may or may not operate in its optimum power range P1opt (in other words this configuration may be considered as a degraded mode of the mixed mode XM).

Advantageously, the automatic method 100 implements several power management modes (main mode, mixed mode, hybrid mode, charge mode) such that for each of them, the generating set 1 operates constantly in its optimum power range Popt; except in the exceptional case of the critical mode OM. In secondary mode SM, the generating set 1 is put on standby.

It should be noted that the probability of occurrence of the critical mode OM remains very low. Its occurrence presupposes very frequent intense peaks in activity of the crane 3 over a long period without there being any possibility of recharging the secondary power source 2. Furthermore, the generating set 1 and the secondary power source 2 are chosen so as to be in line with the power requirements of the crane 3, thus having to prevent this critical mode OM from occurring.

Since the control-command system 30 indirectly manages the main power P1 delivered by the generating set 1 in the mixed mode XM, the hybrid mode HM, and the charge mode CM from a driving of the secondary power source 2 so that it remains in its optimum power range P1opt (the generating set 1 being whatever happens in this optimum power range P1opt in the main mode MM), the examples of the present disclosure have the advantage of not requiring the design and/or installation of a means of communication between the generating set 1 and the crane 3 to exchange information or order.

Also, the generating set 1 does not exchange information with the secondary power source 2 since it is content to deliver a charge power Pload only when it is electrically linked to it, in the mixed mode XM and the charge mode CM, and according to the power demand coming from it.

Consequently, the implementation of the automatic method is therefore more practical and less costly, with fewer hardware, software or protocol means to design and/or install.

The invention claimed is:

1. An automatic method of power management for supplying power to a crane configured to use, for operating and moving a load, an operating power (PF) operable to reach a maximum operating value (PFmax), the automatic method comprising:

a main power source comprising a generating set provided with an endothermic engine configured to supply the crane with a main alternating current for a main power (P1) operable to reach a main maximum value (P1max);

the generating set being sized according to a power ratio such that the main maximum value (P1max) is equal to the maximum operating value (PFmax) multiplied by the power ratio which is lower than 1.2, and the generating set has an optimum power range (P1opt) bounded by a minimum optimum value (P1opt_min) and a maximum optimum value (P1opt_max) which is lower than the main maximum value (P1max); and a secondary power source comprising at least one rechargeable electric battery having a charge level (C) comprised between zero and a maximum charge level (Cmax), and configured to provide a secondary alternating current to deliver a secondary power (P2) and to receive a charge power (Pload) to be electrically recharged;

the automatic method implementing one or more power management modes, wherein the one or more power management modes includes a main mode (MM), in which:

if the operating power (PF) has an operating value included in the optimum power range (P1opt) of the generating set, and if the charge level (C) is greater than a first charge threshold (C1), then the crane is electrically connected to the single generating set so that the crane receives from the generating set the main power (P1) which is equal to the operating value (PF), the generating set then operating in the optimum power range (P1opt).

2. The automatic method according to claim 1, wherein the one or more power management modes further include a mixed mode (XM), in which:

if the operating power (PF) has an operating value non-zero and lower than the maximum optimum value (P1opt_max) and if the charge level (CL) is lower than the first charge threshold (C1), then:

the crane is electrically connected to the single generating set to receive the operating power (PF) from the single generating set, the generating set delivering the main power (P1) which has a main value; and the secondary power source is electrically connected to the generating set to receive from the generating set the charge power (Pload) taking a given charge value, in order to recharge the secondary power source;

and wherein the charge value is adjusted so that the main value, which corresponds to a sum of the operating value and the charge value, is included in the optimum power range (P1opt), the generating set then operating within the optimum power range (P1opt).

3. The automatic method according to claim 2, wherein the one or more power management modes further include:

a hybrid mode (HM), in which:

if the operating power (PF) has an operating value which is greater than the maximum optimum value (P1opt_max), and if the charge level (C) is greater than a second charge threshold (C2), then:

the crane is electrically connected both to the generating set and to the secondary power source so that the crane receives the secondary power (P2) coming from the secondary power source, the secondary power (P2) taking a given secondary value, and the main power (P1) coming from the generating set, the main power (P1) taking a given main value;

and wherein the secondary value is adjusted so that the main value, which corresponds to the difference between the operating value and the secondary value, is included in the optimum power range (P1opt), the generating set then operating within its optimum power range (P1opt); and a charge mode (CM), in which:

if the operating power (PF) has an operating value zero, and if the charge level (C) is lower than the maximum charge threshold (Cmax), then:

the secondary power source is electrically connected to the generating set to receive from the generating set the charge power (Pload) taking a given charge value, in order to recharge the secondary power source;

and wherein the charge value is adjusted so that the main value, which corresponds to the charge value, is included in the optimum power range (P1opt), said generating set then operating within the optimum power range (P1opt);

the automatic method further comprising at least:

a first comparison step (Q1) during which the operating value of the operating power (PF) is compared with the maximum optimum value (P1opt_max), a second comparison step (Q2; Q5; Q6) during which the charge level (C) is compared with the first charge threshold (C1) and/or the second charge threshold (C2) and/or the maximum charge level (Cmax), and a step of selecting (ES) the power management mode from among the main mode (MM), the mixed mode (XM), the hybrid mode (HM) and the charge mode (CM), depending on the comparison results of the comparison steps (Q1; Q2; Q5; Q6).

4. The automatic method according to claim 3, wherein the automatic method further comprises a comparison step (Q3) during which the operating value of the operating power (PF) is compared with the minimum optimum value (P1opt_min).

5. The automatic method according to claim 1, wherein the one or more power management modes further include a hybrid mode (HM), in which:

if the operating power (PF) has an operating value which is greater than the maximum optimum value (P1opt_max), and if the charge level (C) is greater than a second charge threshold (C2), then:

the crane is electrically connected both to the generating set and to the secondary power source so that the crane receives:

the secondary power (P2) coming from the secondary power source, said secondary power (P2) taking a given secondary value; and the main power (P1) coming from the generating set, the main power (P1) taking a given main value;

and wherein the secondary value is adjusted so that the main value, which corresponds to the difference between the operating value and the secondary value, is included in the optimum power range (P1opt), the generating set then operating within the optimum power range (P1opt).

6. The automatic method according to claim 5, wherein, in the hybrid mode (HM), the secondary value is adjusted so that the main value is equivalent to the maximum optimum value (P1opt_max).

7. The automatic method according to claim 5, wherein the second charge threshold (C2) is comprised between 20% and 70% of the maximum charge level (Cmax).

8. The automatic method according to claim 5, wherein at least one of the first charge threshold (C1) and of the second charge threshold (C2) is fixed.

9. The automatic method according to claim 5, wherein at least one of the first charge threshold (C1) and of the second charge threshold (C2) varies depending on a measured temperature.

10. The automatic method according to claim 9, wherein the measured temperature is a temperature of the secondary power source, or an outside temperature.

11. The automatic method according to claim 1, wherein the one or more power management modes further include a charge mode (CM), in which:

if the operating power (PF) has an operating value zero, and if the charge level (C) is lower than the maximum charge threshold (Cmax), then:

the secondary power source is electrically connected to the generating set to receive from the generating set the charge power (Pload) taking a given charge value, in order to recharge the secondary power source;

and wherein the charge value is adjusted so that the main value, which corresponds to the charge value, is included in the optimum power range (P1opt), the generating set then operating within the optimum power range (P1opt).

12. The automatic method according to claim 1, wherein the power ratio is comprised between 0.6 and 1.2.

13. The automatic method according to claim 12, wherein the power ratio is comprised between 0.6 and 0.8.

14. The automatic method according to claim 1, wherein the maximum optimum value (P1opt_max) is equal to kmax times the main maximum value (P1max), kmax being comprised between 0.8 and 0.95.

15. The automatic method according to claim 1, wherein the minimum optimum value (P1opt_min) is equal to kmin times the main maximum value (P1 max), km in being non-zero and depending on intrinsic properties of the generating set.

16. The automatic method according to claim 15, wherein kmin is comprised between 0.4 and 0.8.

17. The automatic method according to claim 1, wherein the first charge threshold (C1) is comprised between 50 and 90% of the maximum charge level (Cmax).

18. A load lifting assembly comprising:

a crane comprising at least several electrical apparatuses and a control-command system in communication with the several electrical apparatuses, the crane configured to use, for operating and moving a load, an operating power (PF) operable to reach a maximum operating value (PFmax), the operating power (PF) being equal to a sum of powers demanded by the electrical apparatuses;

a main power source comprising a generating set provided with an endothermic engine configured to supply the crane with a main alternating current for a main power (P1) operable to reach a main maximum value (P1max);

the generating set being sized according to a power ratio such that the main maximum value (P1max) is equal to the maximum operating value (PFmax) multiplied by the power ratio which is lower than 1.2, and the generating set has an optimum power range (P1opt) bounded by a minimum optimum value (P1opt_min) and a maximum optimum value (P1opt_max) which is lower than the main maximum value (P1max);

a secondary power source comprising at least one rechargeable electric battery having a charge level (C) comprised between zero and a maximum charge level (Cmax), and configured to provide a secondary alternating current to deliver a secondary power (P2) and to receive a charge power (Pload) to be electrically recharged; and an electrical coupling circuit between the crane, the generating set and the secondary power source, wherein the control-command system is in communication with:

the secondary power source to receive the charge level (C) and to adjust a secondary value of the secondary power (P2) and a charge value of the charge power (Pload); and the electrical coupling circuit for driving couplings between the crane, the generating set and the secondary power source, and wherein the control-command system comprises a program for implementing the automatic method of power management according to claim 1.

19. The assembly according to claim 18, wherein the control-command system is configured to send a control order to the electrical coupling circuit, which is configured on receipt of the control order to link or not electrically link the main power source to the secondary power source, the main power source to the crane, and the secondary power source to the crane.

20. The assembly according to claim 19, wherein the control-command system is configured to send the control order depending on results of comparison between at least the operating value of the operating power (PF) and the maximum optimum value (P1opt_max), and also depending on the charge level (C).

* * * * *